(12) United States Patent
Shehata et al.

(10) Patent No.: US 12,518,724 B2
(45) Date of Patent: Jan. 6, 2026

(54) VIGNETTING OF FOVEATED DISPLAY CONTENT SYSTEMS AND METHODS

(71) Applicant: Apple Inc., Cupertino, CA (US)

(72) Inventors: Shereef Shehata, San Ramon, CA (US); Jim C Chou, San Jose, CA (US); Sterling G Orsten, Sunnyvale, CA (US); Shengchang Cai, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 252 days.

(21) Appl. No.: 18/325,997

(22) Filed: May 30, 2023

(65) Prior Publication Data

US 2024/0404488 A1    Dec. 5, 2024

(51) Int. Cl.
*G09G 5/373* (2006.01)
*G09G 5/391* (2006.01)

(52) U.S. Cl.
CPC ............. *G09G 5/373* (2013.01); *G09G 5/391* (2013.01)

(58) Field of Classification Search
CPC ................................ G09G 5/373; G09G 5/391
See application file for complete search history.

(56) References Cited

U.S. PATENT DOCUMENTS 7,548,661 B2 * 6/2009 Lin .................. H04N 25/61
                                                382/282
9,615,062 B2 * 4/2017 Sablak ............. H04N 21/47202
2008/0284879 A1   11/2008 Hu
2017/0094149 A1    3/2017 Gluskin et al.
2022/0086309 A1    3/2022 Kim et al.

OTHER PUBLICATIONS

Zheng, Yuanjie et al., "Single-Image Vignetting Correction," IEEE Transactions on Pattern Analysis and Machine Intelligence, vol. 31, No. 12, Dec. 2009.

* cited by examiner

*Primary Examiner* — Daniel F Hajnik
*Assistant Examiner* — Chris Alejandro Puntier
(74) *Attorney, Agent, or Firm* — Fletcher Yoder, P.C.

(57) ABSTRACT

A system may include a display for displaying an image frame that is divided into regions having respective resolutions based on display image data. The device may also include image processing circuitry to generate the display image data based on multi-resolution image data and vignetting data generated by determining a phase offset of the pixel grouping indicative of a relative distance between the pixel grouping and a grid line of a vignetting grid and determining a relative location of the pixel grouping with respect to a set of the grid points based on the phase offset and interpolating between the vignetting values of the set of grid points to generate the vignetting data based on the relative location. The vignetting grid may include multiple grid points having corresponding vignetting values. Additionally, the image processing circuitry may apply the vignetting data to the multi-resolution image data of the pixel grouping.

20 Claims, 14 Drawing Sheets

VIGNETTING OF FOVEATED DISPLAY CONTENT SYSTEMS AND METHODS

BACKGROUND

This disclosure relates to image data processing and vignetting of image data corresponding to variable resolution content to be displayed on an electronic display, such as a foveated display.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Numerous electronic devices—including televisions, portable phones, computers, wearable devices, vehicle dashboards, virtual-reality glasses, and more—display images on an electronic display. To display an image, an electronic display may control light emission of its display pixels based at least in part on corresponding image data. In some scenarios, such as in virtual reality, mixed reality, and/or augmented reality, an image frame of the image data to be displayed may be blended from multiple sources. Moreover, the image data may be processed to account for one or more physical or digital effects associated with generating/displaying the image data. For example, the image data may be warped from an original image space to a display image space to account for geometric distortions associated with displaying the image data (e.g., lensing effects). Furthermore, the image data may be formatted in multiple resolutions, such as for a foveated display that displays multiple different resolutions of an image at different locations on the electronic display depending on a viewer's gaze or focal point on the display. However, an image frame of the warped image data may include areas outside of or otherwise void of content. Moreover, in some scenarios, a user may gaze outside of the active content to a void area. Such a void may result in an undesired, noticeable transitions between the area corresponding to the content and the void area of non-content.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to vignetting of multi-resolution image data that corresponds to variable resolution content (e.g., foveated display content) to be displayed on an electronic display, such as a foveated display. Multi-resolution image data is arranged such that different portions of the display simultaneously display content at different resolutions. For example, different resolutions may be displayed at different areas of the display based on a focal point of a viewer's gaze, such that the image content is displayed at a higher resolution towards the focal point (e.g., where a viewer's eye may have higher acuity) and a lower resolution away from the focal point (e.g., where a viewer's eye may have lower acuity). As such, adjustable regions (e.g., based on the focal point) of different size pixel groupings (e.g., resolutions) are established for each image frame identifying the content resolution for different portions of the electronic display. While not limited to such implementations, such displays may be utilized for virtual reality, mixed reality, and/or augmented reality, where the viewer's eye movement may be tracked. For example, the electronic display may be implemented as wearable glasses/goggles.

Image processing circuitry may provide for vignetting of the image data to darken or otherwise augment pixel values to show fading, such as along the edges of an image or electronic display. For example, pixel values may be gained down for a visual effect and/or to mask transitions or other image artifacts that may otherwise be visible to a viewer. Indeed, in some scenarios, portions of the electronic display may be associated with reduced or no image content, image content of reduced fidelity, and/or image content outside of or along an edge a viewing angle of a viewer that may be desired to be vignetted. Additionally, vignetting regions of the electronic display may reduce power consumption by reducing the overall luminance output in those regions.

In some embodiments, vignetting may be applied based on a vignetting grid distributed across the electronic display. Different amounts of vignetting may be associated with the grid points of the vignetting grid such that pixels within a tile defined by a set of the grid points are assigned an amount of vignetting based on the gird point values. Moreover, in some embodiments, the amount of vignetting for a particular pixel may be interpolated from the amounts of vignetting associated with the set of grid points that define the tile in which the particular pixel is located. However, multi-resolution image data may include pixel groupings that vary (e.g., per image frame) in size and/or location, such as based on a viewer's gaze or a focal point thereof. As such, phase offsets may be determined for pixel groupings to identify their relative positions with respect to the vignetting grid. For example, the phase offset may be an indication of the relative distance of the pixel grouping from the vignetting grid in order to perform an interpolation of the amounts of vignetting associated with the grid points. Additionally, in some embodiments, the amount of vignetting determined for the pixel groupings may be subjected to offsets, gains, saturations, and/or remappings to achieve a desired vignetting curve (e.g., fadeout).

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
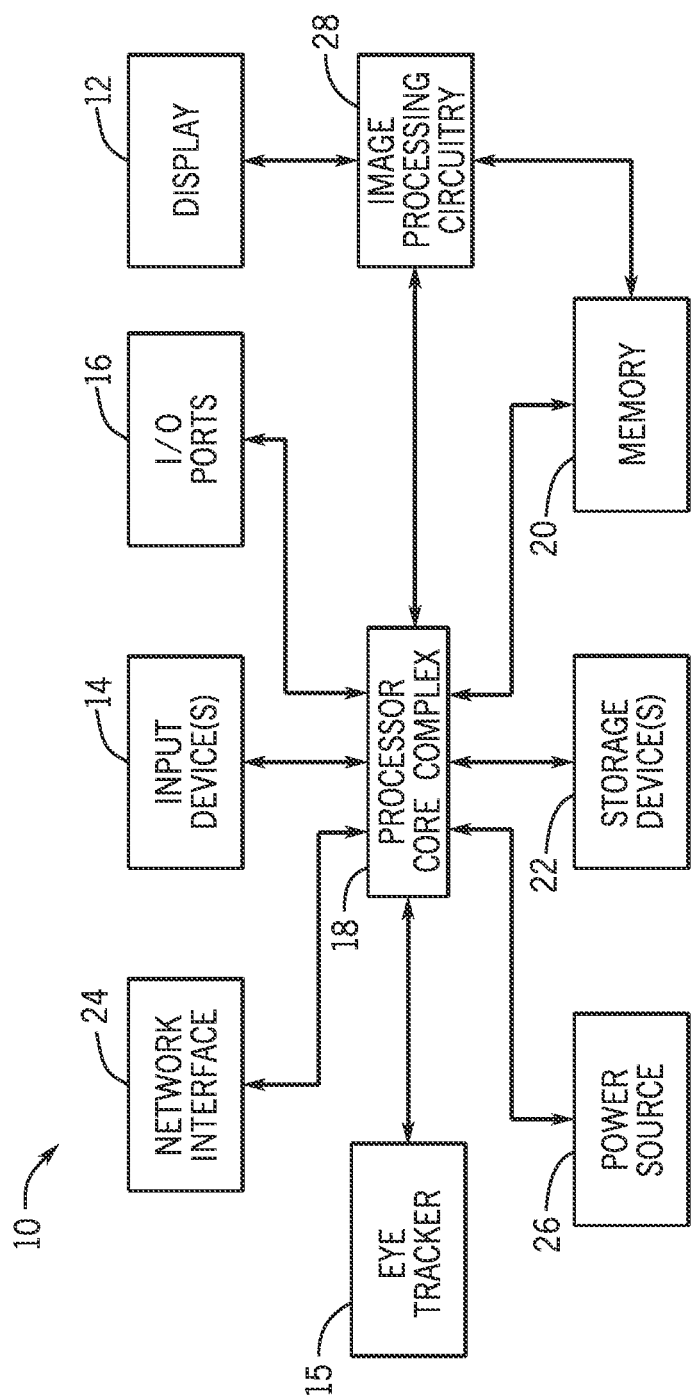
FIG. 1 is a schematic diagram of an electronic device that includes an electronic display, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

Electronic devices often use electronic displays to present visual information. Such electronic devices may include computers, mobile phones, portable media devices, tablets, televisions, virtual-reality headsets, and vehicle dashboards, among many others. To display an image, an electronic display controls the luminance (and, as a consequence of variation in luminance emitted by different red, green, and blue display pixels, the collective color) of its display pixels based on corresponding image data received at a particular resolution. For example, an image data source may provide image data as a stream of pixel data, in which data for each display pixel indicates a target luminance (e.g., brightness) of one or more display pixels located at corresponding pixel positions. In some embodiments, image data may indicate luminance per color component, for example, via red component image data, blue component image data, and green component image data, collectively referred to as RGB image data (e.g., RGB, sRGB). Additionally or alternatively, image data may be indicated by a luma channel and one or more chrominance channels (e.g., YCbCr, YUV), grayscale (e.g., gray level), or other color basis. It should be appreciated that a luma channel, as disclosed herein, may encompass linear, non-linear, and/or gamma-corrected luminance values.

Furthermore, the image data may be formatted in multiple resolutions, such as for a foveated display that displays image content at multiple different resolutions at corresponding different locations on the electronic display depending on a viewer's gaze or focal point on the electronic display. For example, different resolutions may be displayed at different areas of the electronic display based on a focal point of a viewer's gaze, such that the image content is displayed at a higher resolution towards the focal point (e.g., where a viewer's eye may have higher acuity) and a lower resolution away from the focal point (e.g., where a viewer's eye may have lower acuity). As such, adjustable regions (e.g., based on the focal point) of different size pixel groupings are established for each image frame identifying the content resolution for different portions of the electronic display. While not limited to such implementations, such displays may be utilized for virtual reality, mixed reality, and/or augmented reality, where the viewer's eye movement may be tracked. For example, the electronic display may be implemented as wearable glasses/goggles. As should be appreciated, the multi-resolution image data discussed herein may be displayed on any suitable electronic display (e.g., an electronic display having a fixed or varying physical pixel density and/or an electronic display that applies foveation via pixel circuitry).

Additionally, image processing circuitry may enhance, compensate, scale, etc. image data for an improved viewing experience. For example, the image data may be processed to account for one or more physical or digital effects associated with displaying the image data. In some embodiments, image processing circuitry may perform blending and/or warping of image data to generate image content from multiple sources (e.g., generated content, captured content via a camera) and/or perform compensations for display related effects such as burn-compensation, color management, etc.

As discussed herein, image processing circuitry may provide for vignetting of the image data to darken or otherwise augment pixel values to show fading, such as along the edges of an image or electronic display. For example, pixel values may be gained down for a visual effect and/or to mask transitions or other image artifacts that may otherwise be visible to a viewer. Indeed, in some scenarios, portions of the electronic display may be associated with reduced or no image content, image content of reduced fidelity, and/or image content outside of or along an edge a viewing angle of a viewer that may be desired to be vignetted. Additionally, vignetting regions of the electronic display may reduce power consumption by reducing the overall luminance output in those regions.

Furthermore, in some scenarios, source image data may be warped to account for one or more geometric distortions associated with displaying the image, such as a distortion caused by one or more lenses between a viewer and the display panel. Such a warp may result in a rectangular frame of image data (e.g., to be displayed via the electronic display) with a non-rectangular region that represents image content of the unwarped source image data. In some viewing conditions (e.g., a viewing condition of a foveated display where display is based on a viewer's gaze), the viewer may gaze or otherwise be able to see (e.g., via periphery) outside the source content, and/or into a region with reduced or no image content, a region of reduced fidelity, or other region potentially effecting one or more image artifacts. For example, the transition from the image content to the area outside the image source content may become harsh (e.g., more noticeable), which may reduce the experience of the viewer and/or be otherwise undesirable. Such image artifacts may be reduced or eliminated by vignetting regions of the electronic display.

In some embodiments, vignetting may be applied based on a vignetting grid distributed across the electronic display. Different amounts of vignetting may be associated with the grid points of the vignetting grid such that pixels within a tile defined by a set of the grid points are assigned an amount of vignetting based on the gird point values. Moreover, in some embodiments, the amount of vignetting for a particular pixel may be interpolated from the amounts of vignetting associated with the set of grid points that define the tile in which the particular pixel is located. However, multi-resolution image data may include pixel groupings that vary (e.g., per image frame) in size and/or location, such as based on a viewer's gaze or a focal point thereof. As such, the relative locations of the pixel groupings, or characteristic pixel thereof (e.g., center or anchor pixel) may be determined for each image frame and/or for image frames in which the boundaries of the adjustable regions change to calculate the amounts of vignetting for the pixel groupings.

In some embodiments, a phase offset may be determined for a pixel grouping to identify its relative position with respect to the vignetting grid. For example, the phase offset may be an indication of the relative distance of the pixel grouping from the vignetting grid in order to perform an interpolation of the amounts of vignetting associated with the grid points. Additionally, in some embodiments, the amount of vignetting determined for the pixel groupings may be subjected to offsets, gains, saturations, and/or remappings to achieve a desired vignetting curve (e.g., fadeout).

With the foregoing in mind, FIG. 1 is an example electronic device 10 with an electronic display 12 having independently controlled color component illuminators (e.g., projectors, backlights). As described in more detail below, the electronic device 10 may be any suitable electronic device, such as a computer, a mobile phone, a portable media device, a tablet, a television, a virtual-reality headset, a wearable device such as a watch, a vehicle dashboard, or the like. Thus, it should be noted that FIG. 1 is merely one example of a particular implementation and is intended to illustrate the types of components that may be present in an electronic device 10.

The electronic device 10 may include one or more electronic displays 12, input devices 14, an eye tracker 15, input/output (I/O) ports 16, a processor core complex 18 having one or more processors or processor cores, local memory 20, a main memory storage device 22, a network interface 24, a power source 26, and image processing circuitry 28. The various components described in FIG. 1 may include hardware elements (e.g., circuitry), software elements (e.g., a tangible, non-transitory computer-readable medium storing instructions), or a combination of both hardware and software elements. As should be appreciated, the various components may be combined into fewer components or separated into additional components. For example, the local memory 20 and the main memory storage device 22 may be included in a single component. Moreover, the image processing circuitry 28 (e.g., a graphics processing unit, a display image processing pipeline) may be included in the processor core complex 18 or be implemented separately.

The processor core complex 18 is operably coupled with local memory 20 and the main memory storage device 22. Thus, the processor core complex 18 may execute instructions stored in local memory 20 or the main memory storage device 22 to perform operations, such as generating or transmitting image data to display on the electronic display 12. As such, the processor core complex 18 may include one or more general purpose microprocessors such as reduced instruction set computing (RISC) processors, one or more application specific integrated circuits (ASICs), one or more field programmable gate arrays (FPGAs), or any combination thereof.

In addition to program instructions, the local memory 20 or the main memory storage device 22 may store data to be processed by the processor core complex 18. Thus, the local memory 20 and/or the main memory storage device 22 may include one or more tangible, non-transitory, computer-readable media. For example, the local memory 20 may include random access memory (RAM) and the main memory storage device 22 may include read-only memory (ROM), rewritable non-volatile memory such as flash memory, hard drives, optical discs, or the like.

The network interface 24 may communicate data with another electronic device or a network. For example, the network interface 24 (e.g., a radio frequency system) may enable the electronic device 10 to communicatively couple to a personal area network (PAN), such as a Bluetooth network, a local area network (LAN), such as an 802.11x Wi-Fi network, or a wide area network (WAN), such as a 4G, Long-Term Evolution (LTE), or 5G cellular network.

The power source 26 may provide electrical power to operate the processor core complex 18 and/or other components in the electronic device 10. Thus, the power source 26 may include any suitable source of energy, such as a rechargeable lithium polymer (Li-poly) battery and/or an alternating current (AC) power converter.

The I/O ports 16 may enable the electronic device 10 to interface with various other electronic devices. For example, when a portable storage device is connected, the I/O port 16 may enable the processor core complex 18 to communicate data with the portable storage device. Moreover, the input devices 14 may enable a user to interact with the electronic device 10. For example, the input devices 14 may include buttons, keyboards, mice, trackpads, and the like. Additionally or alternatively, the electronic display 12 may include touch sensing components that enable user inputs to the electronic device 10 by detecting occurrence and/or position of an object touching its screen (e.g., surface of the electronic display 12).

Additionally, the electronic display 12 may be a display panel with one or more display pixels. For example, the electronic display 12 may include a self-emissive pixel array having an array of one or more of self-emissive pixels or liquid crystal pixels. The electronic display 12 may include any suitable circuitry (e.g., display driver circuitry) to drive the self-emissive pixels, including for example row driver and/or column drivers (e.g., display drivers). Each of the self-emissive pixels may include any suitable light emitting element, such as an LED (e.g., an OLED or a micro-LED). However, any other suitable type of pixel, including non-self-emissive pixels (e.g., liquid crystal as used in liquid crystal displays (LCDs), digital micromirror devices (DMD) used in DMD displays) may also be used. The electronic display 12 may control light emission from the display pixels to present visual representations of information, such as a graphical user interface (GUI) of an operating system, an application interface, a still image, or video content, by displaying frames of image data. To display images, the electronic display 12 may include display pixels implemented on the display panel. The display pixels may represent sub-pixels that each control a luminance value of one color component (e.g., red, green, or blue for an RGB pixel arrangement or red, green, blue, or white for an RGBW arrangement). As used herein, a display pixel may refer to a collection of sub-pixels (e.g., red, green, and blue subpixels) or may refer to a single sub-pixel.

The eye tracker 15 may measure positions and movement of one or both eyes of someone viewing the electronic display 12 of the electronic device 10. For instance, the eye tracker 15 may include a camera that can record the movement of a viewer's eyes as the viewer looks at the electronic display 12. However, several different practices may be employed to track a viewer's eye movements. For example, different types of infrared/near infrared eye tracking techniques such as bright-pupil tracking and dark-pupil tracking may be used. In both of these types of eye tracking, infrared or near infrared light is reflected off of one or both of the eyes of the viewer to create corneal reflections. A vector between the center of the pupil of the eye and the corneal reflections may be used to determine a point on the electronic display 12 at which the viewer is looking. The processor core complex 18 may use the gaze angle(s) of the eyes of the viewer when generating/processing image data for display on the electronic display 12.

As described above, the electronic display 12 may display an image by controlling the luminance output (e.g., light emission) of the sub-pixels based on corresponding image data. In some embodiments, pixel or image data may be generated by an image source, such as the processor core complex 18, a graphics processing unit (GPU), or an image sensor (e.g., camera). Additionally, in some embodiments, image data may be received from another electronic device 10, for example, via the network interface 24 and/or an I/O port 16. Moreover, in some embodiments, the electronic device 10 may include multiple electronic displays 12 and/or may perform image processing (e.g., via the image processing circuitry 28) for one or more external electronic displays 12, such as connected via the network interface 24 and/or the I/O ports 16.

Figure 2:
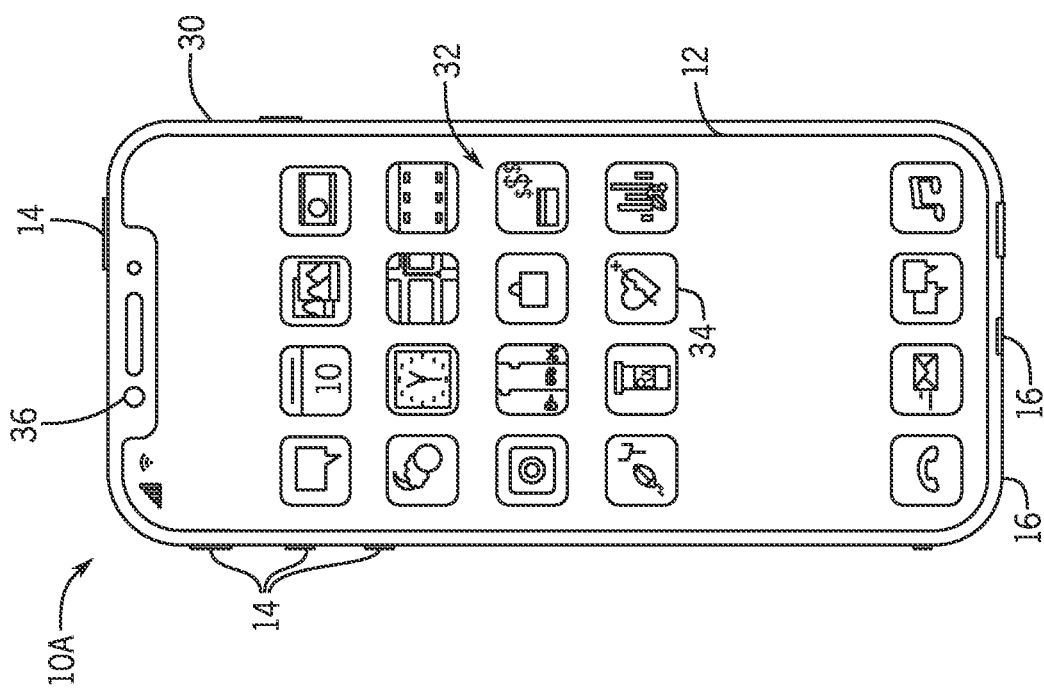
FIG. 2 is an example of the electronic device of FIG. 1 in the form of a handheld device, in accordance with an embodiment.

The electronic device 10 may be any suitable electronic device. To help illustrate, one example of a suitable electronic device 10, specifically a handheld device 10A, is shown in FIG. 2. In some embodiments, the handheld device 10A may be a portable phone, a media player, a personal data organizer, a handheld game platform, and/or the like. For illustrative purposes, the handheld device 10A may be a smartphone, such as an IPHONE® model available from Apple Inc.

The handheld device 10A may include an enclosure 30 (e.g., housing) to, for example, protect interior components from physical damage and/or shield them from electromagnetic interference. The enclosure 30 may surround, at least partially, the electronic display 12. In the depicted embodiment, the electronic display 12 is displaying a graphical user interface (GUI) 32 having an array of icons 34. By way of example, when an icon 34 is selected either by an input device 14 or a touch-sensing component of the electronic display 12, an application program may launch.

Input devices 14 may be accessed through openings in the enclosure 30. Moreover, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. Moreover, the I/O ports 16 may also open through the enclosure 30. Additionally, the electronic device may include one or more cameras 36 to capture pictures or video. In some embodiments, a camera 36 may be used in conjunction with a virtual reality or augmented reality visualization on the electronic display 12.

Figure 3:
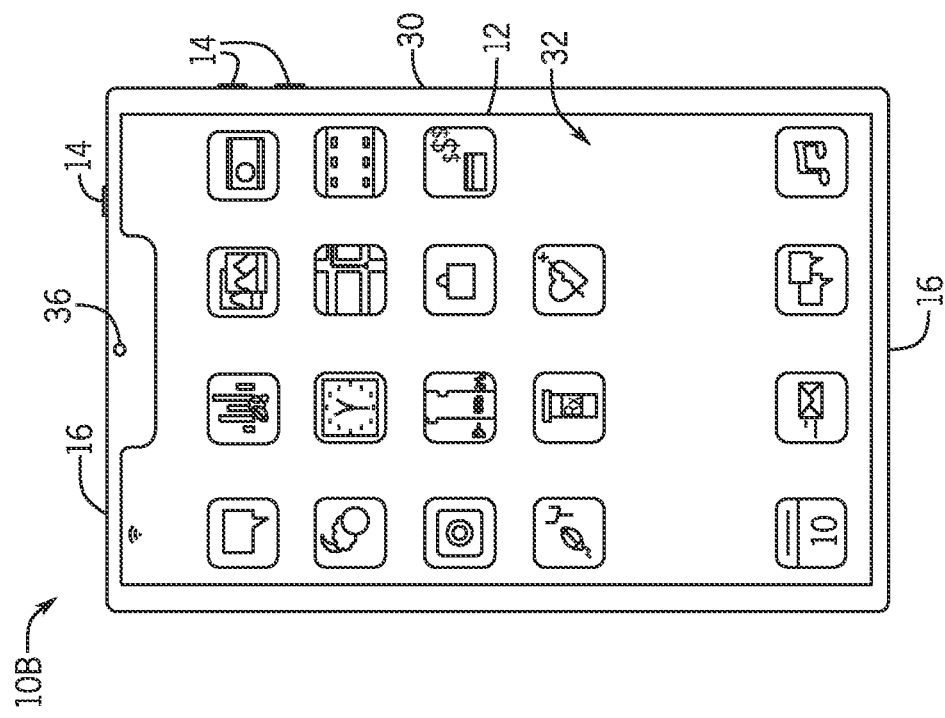
FIG. 3 is another example of the electronic device of FIG. 1 in the form of a tablet device, in accordance with an embodiment.
Figure 4:
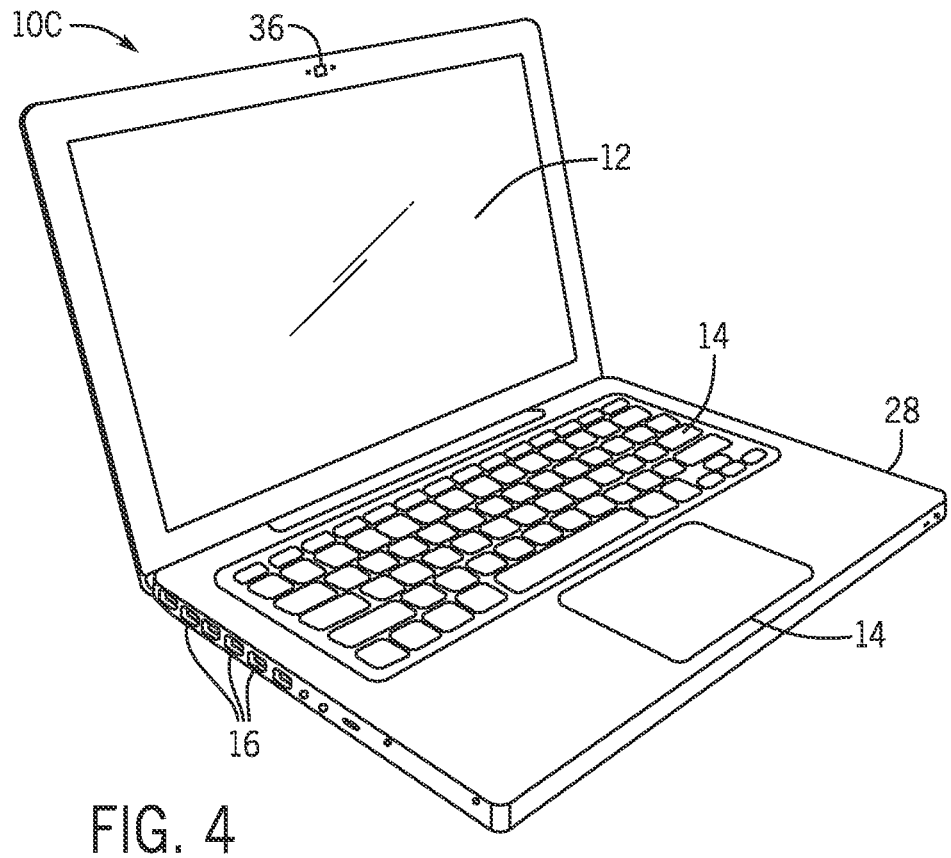
FIG. 4 is another example of the electronic device of FIG. 1 in the form of a computer, in accordance with an embodiment.
Figure 5:
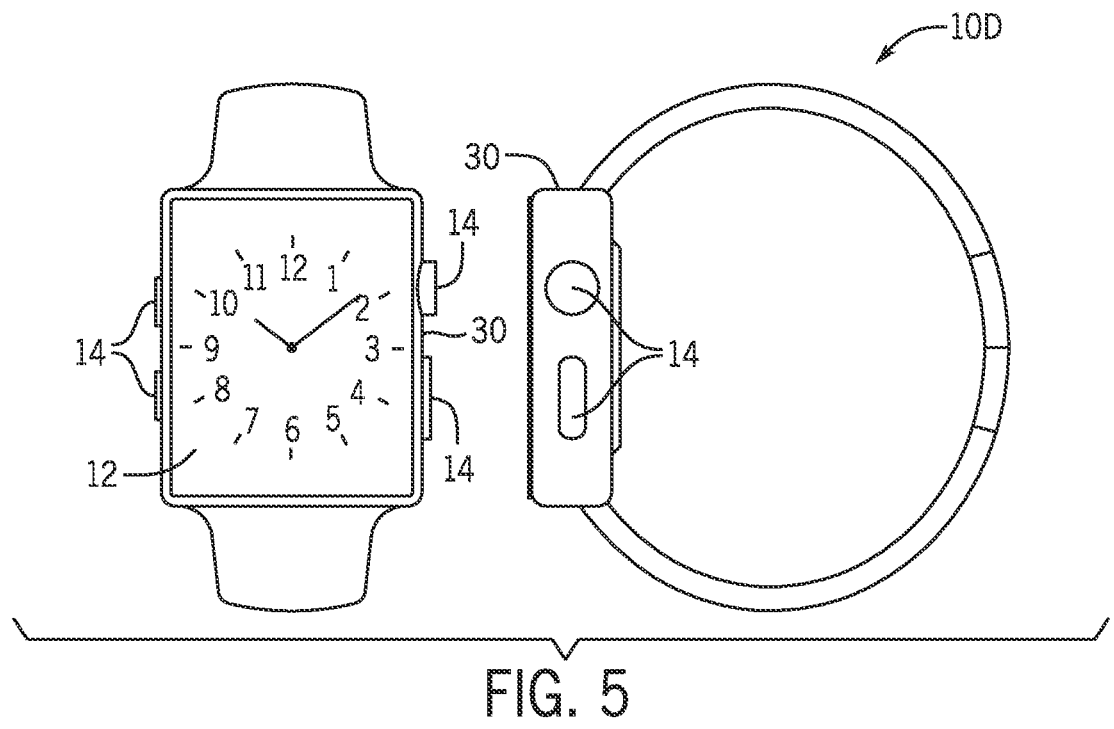
FIG. 5 is another example of the electronic device of FIG. 1 in the form of a watch, in accordance with an embodiment.

Another example of a suitable electronic device 10, specifically a tablet device 10B, is shown in FIG. 3. The tablet device 10B may be any IPAD® model available from Apple Inc. A further example of a suitable electronic device 10, specifically a computer 10C, is shown in FIG. 4. For illustrative purposes, the computer 10C may be any MACBOOK® or IMAC® model available from Apple Inc. Another example of a suitable electronic device 10, specifically a watch 10D, is shown in FIG. 5. For illustrative purposes, the watch 10D may be any APPLE WATCH® model available from Apple Inc. As depicted, the tablet device 10B, the computer 10C, and the watch 10D each also includes an electronic display 12, input devices 14, I/O ports 16, and an enclosure 30. The electronic display 12 may display a GUI 32. Here, the GUI 32 shows a visualization of a clock. When the visualization is selected either by the input device 14 or a touch-sensing component of the electronic display 12, an application program may launch, such as to transition the GUI 32 to presenting the icons 34 discussed in FIGS. 2 and 3.

Figure 6:
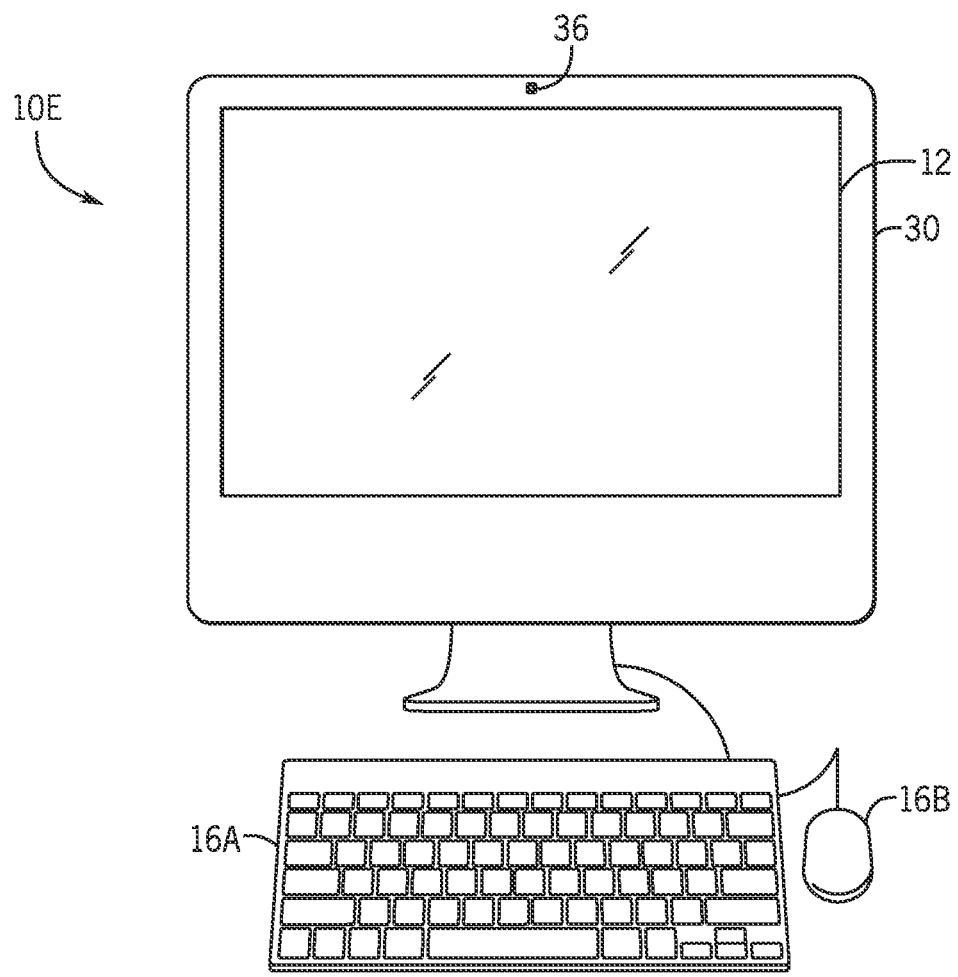
FIG. 6 is another example of the electronic device of FIG. 1 in the form of a computer, in accordance with an embodiment.

Turning to FIG. 6, a computer 10E may represent another embodiment of the electronic device 10 of FIG. 1. The computer 10E may be any suitable computer, such as a desktop computer, a server, or a notebook computer, but may also be a standalone media player or video gaming machine. By way of example, the computer 10E may be an iMac®, a MacBook®, or other similar device by Apple Inc. of Cupertino, California. It should be noted that the computer 10E may also represent a personal computer (PC) by another manufacturer. A similar enclosure 30 may be provided to protect and enclose internal components of the computer 10E, such as the electronic display 12. In certain embodiments, a user of the computer 10E may interact with the computer 10E using various peripheral input devices 14, such as a keyboard 14A or mouse 14B, which may connect to the computer 10E.

As described above, the electronic display 12 may display images based at least in part on image data. Before being used to display a corresponding image on the electronic display 12, the image data may be processed, for example, via the image processing circuitry 28. In general, the image processing circuitry 28 may process the image data for display on one or more electronic displays 12. For example, the image processing circuitry 28 may include a display pipeline, memory-to-memory scaler and rotator (MSR) circuitry, warp compensation circuitry, or additional hardware or software means for processing image data. The image data may be processed by the image processing circuitry 28 to reduce or eliminate image artifacts, compensate for one or more different software or hardware related effects, and/or format the image data for display on one or more electronic displays 12. As should be appreciated, the present techniques may be implemented in standalone circuitry, software, and/or firmware, and may be considered a part of, separate from, and/or parallel with a display pipeline or MSR circuitry.

Figure 7:
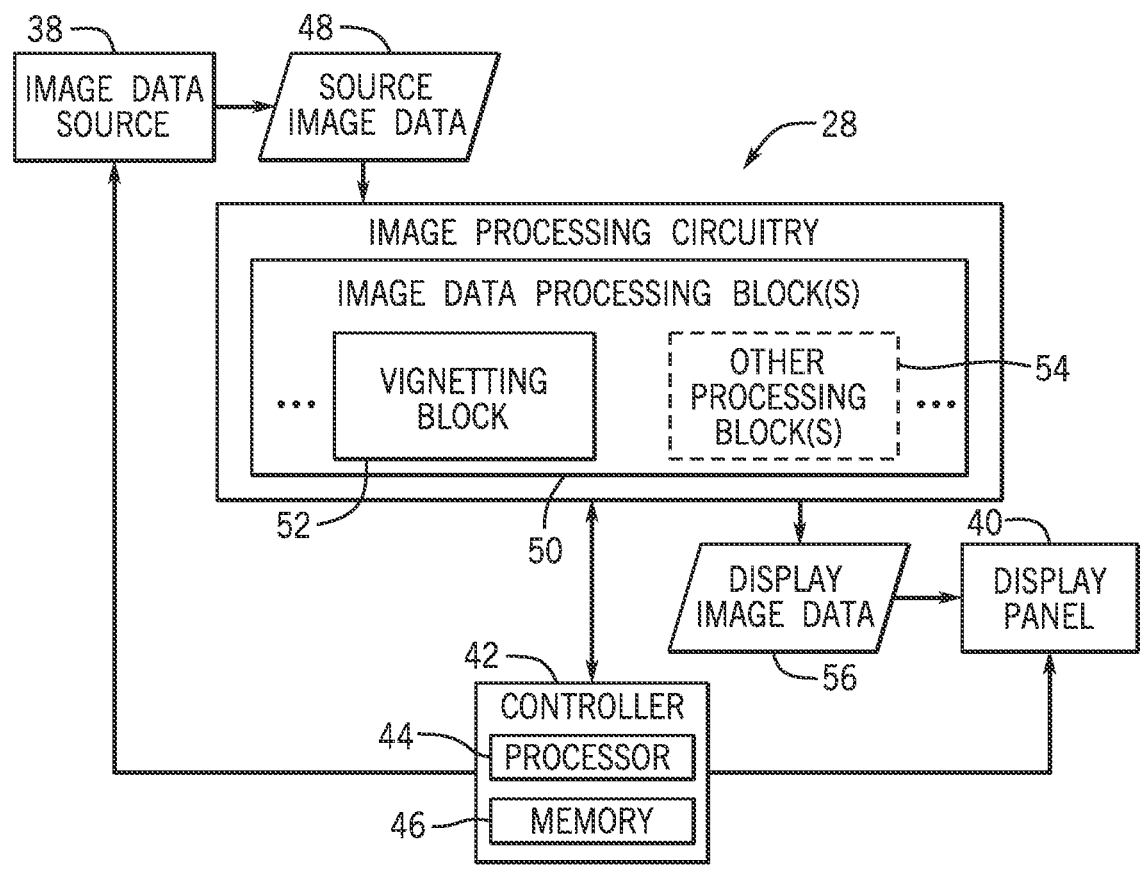
FIG. 7 is a schematic diagram of the image processing circuitry of FIG. 1 including a vignetting block, in accordance with an embodiment.

To help illustrate, a portion of the electronic device 10, including image processing circuitry 28, is shown in FIG. 7. The image processing circuitry 28 may be implemented in the electronic device 10, in the electronic display 12, or a combination thereof. For example, the image processing circuitry 28 may be included in the processor core complex 18, a timing controller (TCON) in the electronic display 12, or any combination thereof. As should be appreciated, although image processing is discussed herein as being performed via a number of image data processing blocks, embodiments may include hardware or software components to carry out the techniques discussed herein.

The electronic device 10 may also include an image data source 38, a display panel 40, and/or a controller 42 in communication with the image processing circuitry 28. In some embodiments, the display panel 40 of the electronic display 12 may be a self-emissive display panel (e.g., OLED, LED, µLED, HOLED), transmissive display panel (e.g., a liquid crystal display (LCD)), a reflective technology display panel (e.g., DMD display), or any other suitable type of display panel 40. In some embodiments, the controller 42 may control operation of the image processing circuitry 28, the image data source 38, and/or the display panel 40. The controller 42 may include a controller processor 44 and/or controller memory 46. The controller processor 44 may be any suitable microprocessor, such as a general-purpose microprocessor such as a reduced instruction set computing (RISC) processor, an application specific integrated circuit (ASIC), a field programmable gate array (FPGA), or any combination thereof. In some embodiments, the controller processor 44 may be included in the processor core complex 18, the image processing circuitry 28, a timing controller in the electronic display 12, a separate processing module, or any combination thereof and execute instructions stored in the controller memory 46. Additionally, in some embodiments, the controller memory 46 may be included in the local memory 20, the main memory storage device 22, a separate tangible, non-transitory, computer-readable medium, or any combination thereof.

The image processing circuitry 28 may receive source image data 48 corresponding to a desired image to be displayed on the electronic display 12 from the image data source 38. The source image data 48 may indicate target characteristics (e.g., pixel data) corresponding to the desired image using any suitable source format, such as an RGB format, an αRGB format, a YCbCr format, and/or the like. Moreover, the source image data may be fixed or floating point and be of any suitable bit-depth. Furthermore, the source image data 48 may reside in a linear color space, a gamma-corrected color space, or any other suitable color space. As used herein, pixels or pixel data may refer to a grouping of sub-pixels (e.g., individual color component pixels such as red, green, and blue) or the sub-pixels themselves.

As described above, the image processing circuitry 28 may operate to process source image data 48 received from the image data source 38. The image data source 38 may include captured images (e.g., from one or more cameras 36), images stored in memory, graphics generated by the processor core complex 18, or a combination thereof. Additionally, the image processing circuitry 28 may include one or more image data processing blocks 50 (e.g., circuitry, modules, or processing stages) such as a vignetting block 52. As should be appreciated, multiple other processing blocks 54 may also be incorporated into the image processing circuitry 28, such as a pixel contrast control (PCC) block, a burn-in compensation (BIC)/burn-in statistics (BIS) block, an enhancement block, a color management block, a dither block, a blend block, a warp block, a scaling/rotation block, etc. before and/or after the vignetting block 52. The image data processing blocks 50 may receive and process source image data 48 and output display image data 56 in a format (e.g., digital format, image space, and/or resolution) interpretable by the display panel 40. For example, in the case of a foveated display (e.g., an electronic display 12 outputting multi-resolution image data), the image data processing blocks 50 may output display image data 56 in the multi-resolution format.

Furthermore, the functions (e.g., operations) performed by the image processing circuitry 28 may be divided between various image data processing blocks 50, and, while the term "block" and/or "sub-block" is used herein, there may or may not be a logical or physical separation between the image data processing blocks 50 and/or sub-blocks thereof. After processing, the image processing circuitry 28 may output the display image data 56 to the display panel 40. Based at least in part on the display image data 56, the display panel 40 may apply electrical signals to the display pixels of the electronic display 12 to output desired luminances corresponding to the image. Furthermore, the image processing circuitry 28 may be disposed across one or more electronic devices 10. For example, image data may be processed (at least in part) in the image processing circuitry 28 of multiple different electronic devices 10 to generate the display image data 56.

As discussed herein, the vignetting block 52 of the image processing circuitry 28 may provide for vignetting of the image data to darken or otherwise augment pixel values to produce a shading or fading effect, such as along the edges of an image or the electronic display 12. For example, pixel values may be gained down by a multiplier between zero and one to create a visual effect (e.g., fading) and/or to mask transitions or other image artifacts that may otherwise be visible. Indeed, in some scenarios, portions of the electronic display 12 may be associated with reduced or no image content, image content of reduced fidelity, and/or image content outside of or along an edge a viewing angle of a viewer (e.g., peripheral vision of the viewer) that may be desired to be vignetted.

Additionally, vignetting regions of the electronic display may reduce power consumption by reducing the overall luminance output in those regions. For example, vignetting portions of the electronic display 12 outside a viewing angle (e.g., peripheral) of a viewer may save power by reducing the current to pixels in areas of the electronic display 12 that are not being viewed. Moreover, providing a fade or shading around the image content in the viewing area may provide an aesthetic effect while reducing the overall current utilized by the pixels, thus saving power. As should be appreciated, the vignetting block 52 may be disposed at any suitable point in the image processing circuitry 28, such that the display image data 56 includes the vignetting effect.

Figure 8:
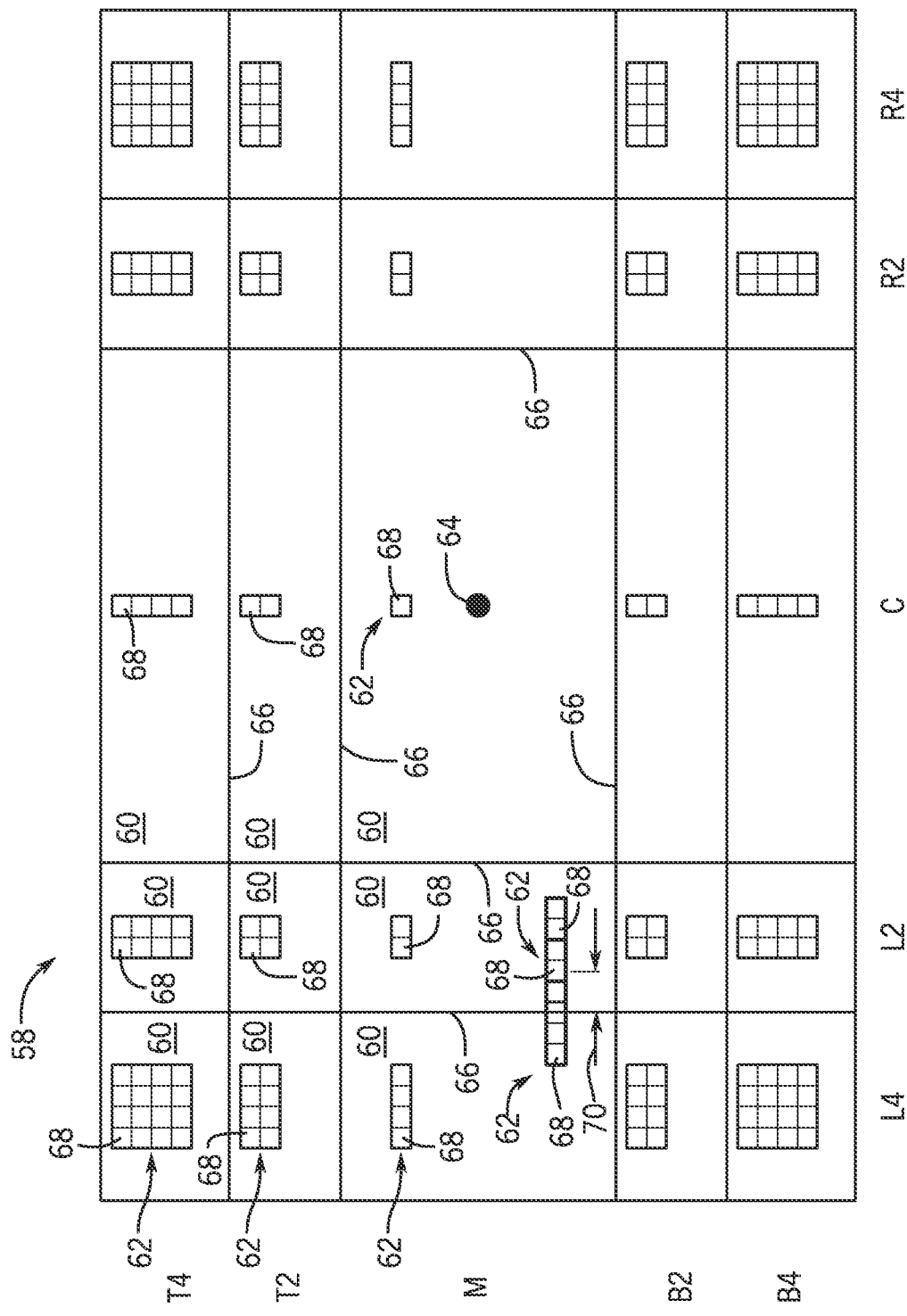
FIG. 8 is an example layout of multiple adjustable regions of pixel groupings of a foveated display, in accordance with an embodiment.

As discussed herein, in some scenarios, the display image data 56 may be output from the image processing circuitry 28 in a multi-resolution format to an electronic display 12 to be displayed in multiple resolutions. As should be appreciated, the boundaries of the regions of the multi-resolution format may be fixed or adjustable and may be based on the specifications of the electronic display 12 that receives the display image data 56 and/or based on a viewer's focal point, which may change on each image frame. To help illustrate, FIG. 8 is a foveated display 58 having multiple adjustable regions 60 of pixel groupings 62. In general, a foveated display 58 has a variable content resolution across the display panel 40 such that different portions of the display panel 40 are displayed at different resolutions depending on a focal point 64 (e.g., center of the viewer's gaze) of the user's gaze (e.g., determined by eye-tracking). By reducing the content resolution in certain portions of the display panel 40, image processing time and/or resource utilization may be reduced. While the human eye may have its best acuity at the focal point 64, further from the focal point 64, a viewer may not be able to distinguish between high and low resolutions. As such, higher content resolutions may be utilized in regions of the foveated display 58 near the focal point 64, while lesser content resolutions may be utilized further from the focal point 64. For example, if a viewer's focal point 64 is at the center of the foveated display 58, the portion of the foveated display 58 at the center may be set to have the highest content resolution (e.g., with 1×1 pixel grouping 62), and portions of the foveated display 58 further from the focal point 64 may have lower content resolutions with larger pixel groupings 62. In the example of FIG. 8, the focal point 64 is in the center of the foveated display 58 giving symmetrical adjustable regions 60. However, depending on the location of the focal point 64, the locations of the boundaries 66 and the sizes of the adjustable regions 60 may vary.

In the depicted example, the foveated display 58 is divided into a set of 5×5 adjustable regions 60 according to their associated pixel groupings 62. In other words, five columns (e.g., L4, L2, C, R2, and R4) and five rows (e.g., T4, T2, M, B2, and B4) may define the adjustable regions 60. The center middle (C, M) adjustable region coincides with the focal point 64 of the viewer's gaze and may utilize the native resolution of the display panel 40 (e.g., 1×1 pixel grouping 62). Adjustable regions 60 in columns to the right of center (C), such as R2 and R4, have a reduced content resolution in the horizontal direction by a factor of two and four, respectively. Similarly, adjustable regions 60 in columns to the left of center, such as L2 and L4, have a reduced content resolution in the horizontal direction by a factor of two and four, respectively. Moreover, rows on top of the middle (M), such as T2 and T4, have a reduced content resolution in the vertical direction by a factor of two and four, respectively. Similarly, rows below the middle (M), such as B2 and B4, have a reduced content resolution in the vertical direction by a factor of two and four, respectively.

As such, depending on the adjustable region 60, the content resolution may vary horizontally and/or vertically.

The pixel groupings 62 may be indicative of the set of display pixels that utilize the same image data in the reduced content resolutions. For example, while the adjustable region 60 at the focal point 64 may be populated by 1×1 pixel groupings 62, the adjustable region 60 in column LA and row M may be populated by 4×1 pixel groupings 62 such that individual pixel values, processed as corresponding to individual pixel locations in the reduced content resolution, are each sent to sets of four horizontal pixels of the display panel 40. Similarly, the adjustable region 60 in column L4 and row T4 may be populated by 4×4 pixel groupings 62 such that pixel values are updated sixteen pixels at a time. As should be appreciated, while discussed herein as having reduced content resolutions by factors of two and four, any suitable content resolution or pixel groupings 62 may be used depending on implementation. Furthermore, while discussed herein as utilizing a 5×5 set of adjustable regions 60, any number of columns and rows may be utilized with additional or fewer content resolutions depending on implementation.

As the focal point 64 moves the boundaries 66 of the adjustable regions 60, and the sizes thereof, may also move. For example, if the focal point 64 were to be on the far upper right of the foveated display 58, the center middle (C, M) adjustable region 60, coinciding with the focal point 64, may be set to the far upper right of the foveated display 58. In such a scenario, the T2 and T4 rows and the R2 and R4 columns may have heights and widths of zero, respectively, and the remaining rows and columns may be expanded to encompass the foveated display 58. As such, the boundaries 66 of the adjustable regions 60 may be adjusted based on the focal point 64 to define the pixel groupings 62 for different portions of the foveated display 58.

As discussed herein, the pixel groupings 62 are blocks of pixels that receive the same image data as if the block of pixels was a single pixel in the reduced content resolution of the associated adjustable region 60. To track the pixel groupings 62, an anchor pixel 68 may be assigned for each pixel grouping 62 to denote a single pixel location that corresponds to the pixel grouping 62. For example, the anchor pixel 68 may be the top left pixel in each pixel grouping 62. The anchor pixels 68 of adjacent pixel groupings 62 within the same adjustable region 60 may be separated by the size of the pixel groupings 62 in the appropriate direction. Furthermore, in some scenarios, pixel groupings 62 may cross one or more boundaries 66. For example, an anchor pixel 68 may be in one adjustable region 60, but the remaining pixels of the pixel grouping 62 may extend into another adjustable region 60. As such, in some embodiments, an offset 70 may be set for each column and/or row to define a starting position for anchor pixels 68 of the pixel groupings 62 of the associated adjustable region 60 relative to the boundary 66 that marks the beginning (e.g., left or top side) of the adjustable region 60. For example, an anchor pixel 68 at a boundary 66 (e.g., corresponding to a pixel grouping 62 that is on the left and/or upper boundary 66 of an adjustable region 60) may have an offset 70 of zero, while an anchor pixel 68 that is two pixels removed from (e.g., to the right of or below) the boundary 66 (e.g., as exampled in FIG. 8) may have an offset 70 of one in the corresponding direction. Such offsets 70 may be utilized to augment pixel values (e.g., as a pixel grouping 62 or individually) based on relative locations to the boundaries 66 and/or for tracking where the pixel groupings 62 of a next (e.g., to the right and/or down relative to a raster scan order)

adjustable region 60 begin relative to the boundaries 66 thereof. As should be appreciated, while the top left pixel is exampled herein as an anchor pixel 68 and the top and left boundaries 66 are defined as the starting boundaries (e.g., in accordance with raster scan), any pixel location of the pixel grouping 62 may be used as the representative pixel location and any suitable directions may be used for boundaries 66, depending on implementation (e.g., read order). Additionally, while the boundaries 66 are shown as being disposed through pixels (e.g., aligned at centers of pixels), in some embodiments, the boundaries 66 may be aligned along the edges of the pixels (e.g., aligned between pixels).

While not limited to such implementations, displays such as foveated displays 58 may be utilized for virtual reality, mixed reality, and/or augmented reality, where the viewer's eye movement may be tracked (e.g., via an eye tracker 15). Indeed, image data in a multi-resolution format (e.g., a format having different content resolutions at different locations within a single image frame) may be used in virtual reality, mixed reality, and/or augmented reality to improve a user's experience, increase perceived realism, and/or reduce processing intensity due to the relatively reduced resolution in some areas, thereby increasing efficiency and/or processing bandwidth. In some embodiments, content may be blended from multiple sources (e.g., camera feed, rendered graphics) to provide the virtual reality, mixed reality, and/or augmented reality experience.

In some scenarios, when generating the multi-resolution image data source 38 (or a derivation thereof) may be warped to account for one or more geometric distortions associated with displaying the image, such as a distortion caused by one or more lenses between a viewer and the display panel 40. Such a warp may result in a rectangular frame of image data (e.g., to be displayed via the electronic display 12) with a non-rectangular region that corresponds to the image content of the unwarped image data. In some viewing conditions (e.g., a viewing condition of a foveated display 58), the viewer may gaze or otherwise be able to see (e.g., via periphery) outside the source content, and/or into a region with reduced or no image content, a region of reduced fidelity, or other region potentially effecting one or more image artifacts. For example, the transition from image content to the area having no image content or outside the display panel 40 may be harsh (e.g., noticeable), which may reduce the experience of the viewer and/or be otherwise undesirable. Such image artifacts may be reduced or eliminated by vignetting the image data.

Figure 9:
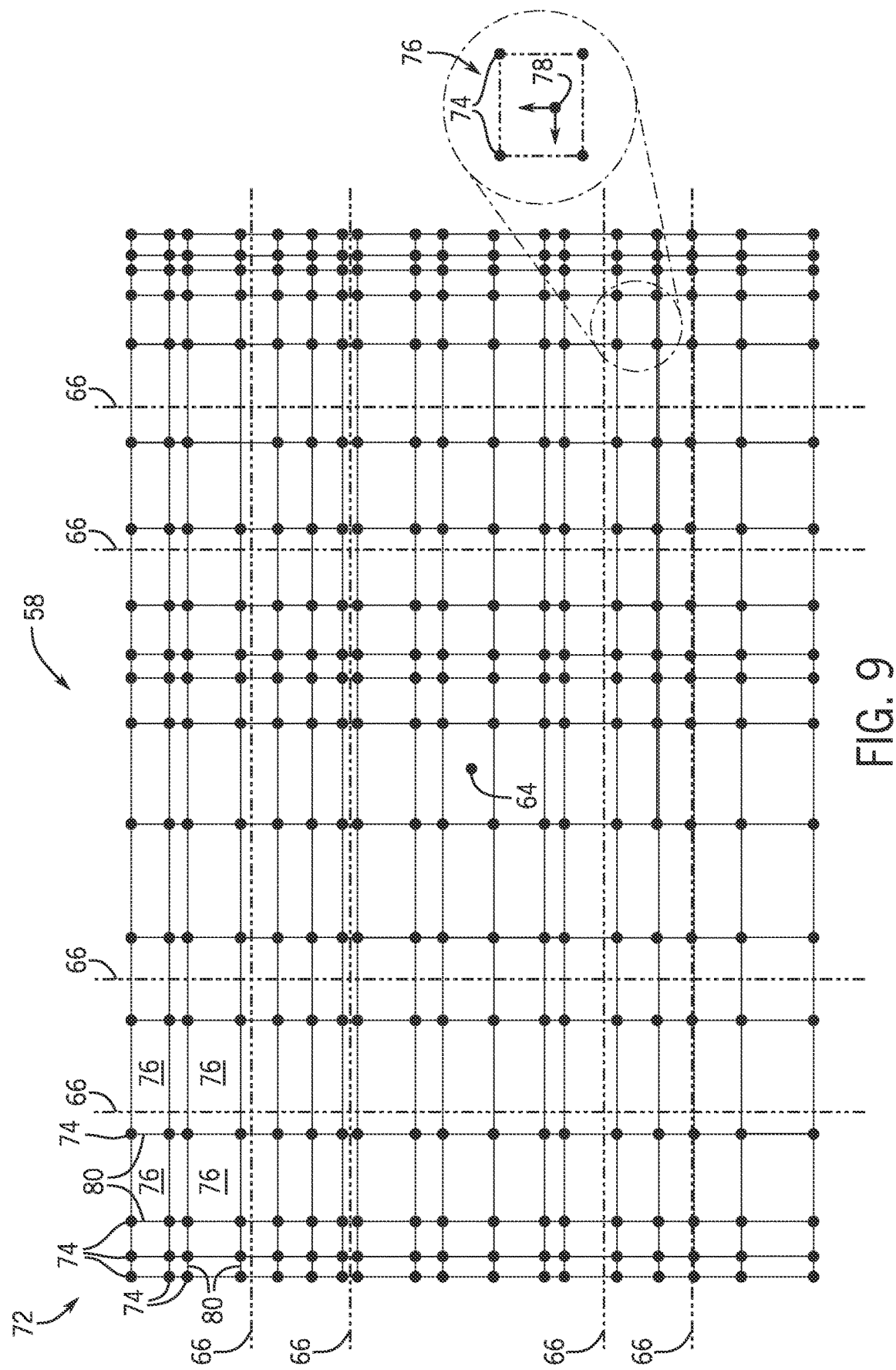
FIG. 9 is an example layout of a vignetting grid distributed across the foveated display of FIG. 8.

In some embodiments, vignetting may be applied based on a vignetting grid 72 distributed across an electronic display 12, such as a foveated display 58, as shown in FIG. 9. The vignetting grid 72 may be defined by grid points 74 that are associated with different amounts of vignetting. For example, sets of four grid points 74 may define tiles 76, and vignetting at a particular pixel position 78 (e.g., position of an anchor pixel 68 or average pixel location of a pixel grouping 62) may be determined by interpolating between the amounts of vignetting associated with the grid points 74 of the relevant tile 76, based on the relative position of the pixel position 78 within the tile 76. In some embodiments, the grid points 74 of the vignetting grid 72 may be unevenly spaced across the display panel 40. For example, the grid points 74 may be more closely spaced (e.g., for higher granularity vignetting) toward the edges of the display panel 40. Moreover, in some embodiments, the vignetting grid 72 may be distributed dynamically such that the vignetting grid 72 is changed based on where and/or how much vignetting is desired in different areas of the electronic display 12. For example, in a similar manner as to how the boundaries 66 of the adjustable regions 60 may be defined relative to the physical positions of pixels of the display panel 40, the grid points 74 and associated grid lines 80 of the vignetting grid 72 may be dynamically defined relative to the physical positions of the display panel 40. In other words, the vignetting grid 72 may be set with respect to the physical pixels of the display panel 40. Alternatively, the vignetting grid 72 may be fixed with respect to the display panel 40.

However, multi-resolution image data may include pixel groupings 62 that vary (e.g., per image frame) in size and/or location, such as based on a viewer's gaze or a focal point 64 thereof. Indeed, as the sizes of the pixel groupings 62 change (e.g., according to the resolution of the applicable adjustable region 60), the anchor pixels 68 of the pixel groupings 62 may change locations. As such, the relative locations of the pixel groupings 62, or a characteristic pixel thereof (e.g., center or anchor pixel 68), with respect to the grid lines 80 may be determined for each image frame and/or for image frames in which the boundaries 66 of the adjustable regions 60 change to calculate the amounts of vignetting for the pixel groupings 62. For example, phase offsets may be determined for each pixel grouping 62 to determine a relative offset between the anchor pixel 68 of the grid line 80 of the relevant tile 76.

Figure 10A:
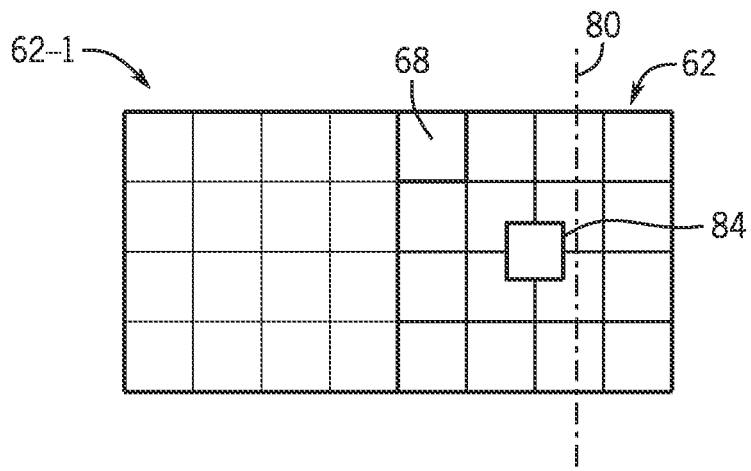
FIGS. 10A-10F are schematic diagrams of relative positions of 4×4 pixel groupings to gridlines of the vignetting grid of FIG. 9.
Figure 10B:
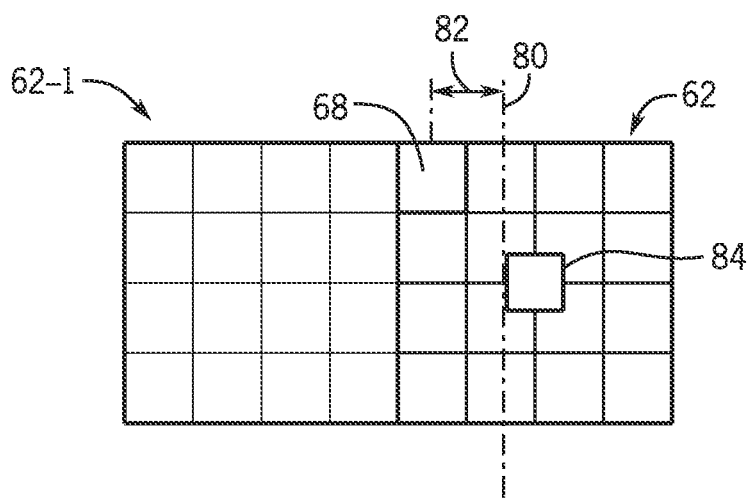

As discussed above, the pixel groupings 62 may be of varying size (e.g., corresponding to the resolution of the relevant adjustable region 60). To determine the relative location (e.g., phase offset) of the anchor pixel 68 with respect to the grid lines 80, it may be determined if a pixel grouping 62 of interest has crossed a grid line 80. Moreover, the different sizes of the pixel groupings 62 may lead to different amounts of phase offset. FIGS. 10A-10F are schematic diagrams of the 4×4 pixel groupings 62 at different relative locations with different phase offsets 82 in the horizontal direction with respect to a vertical grid line 80. For example, in FIG. 10A, the anchor pixel 68 of the pixel grouping 62 has not yet crossed the grid line 80. As such, the phase offset 82 may be unchanged from the previous pixel grouping 62-1. In FIG. 10B, the anchor pixel 68 has not yet crossed the grid line 80. However, in some scenarios, it may be desirable to utilize a center 84 of the pixel grouping 62 as a characteristic pixel of the pixel grouping 62. As such, it may be desired to note the crossing of the center 84, relative to the grid line 80. In the case of a M×N pixel grouping 62, where M is greater than or equal to three, the scenario of FIG. 10B may occur where the center 84 that has crossed the grid line 80, but the anchor pixel 68 that has not. To distinguish such a case, the phase offset 82 may be determined as −1. For consistency, as used herein, the anchor pixel 68 will be used to define the phase offset 82 of the pixel grouping 62. As should be appreciated, any suitable reference point may be utilized for the phase offset 82, depending on implementation (e.g., use of characteristic pixel).

Figure 10C:
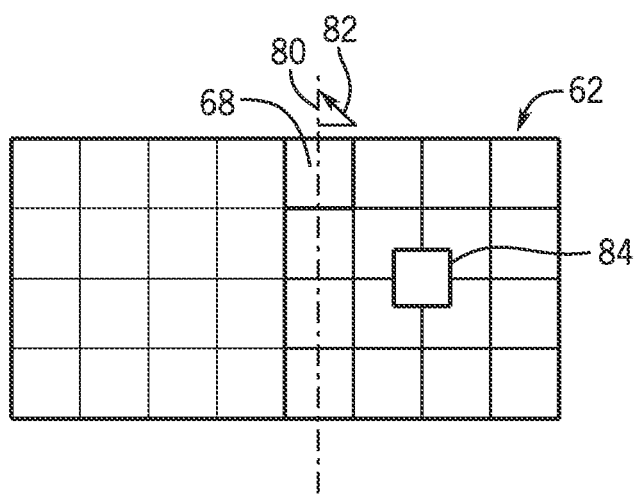
Figure 10D:
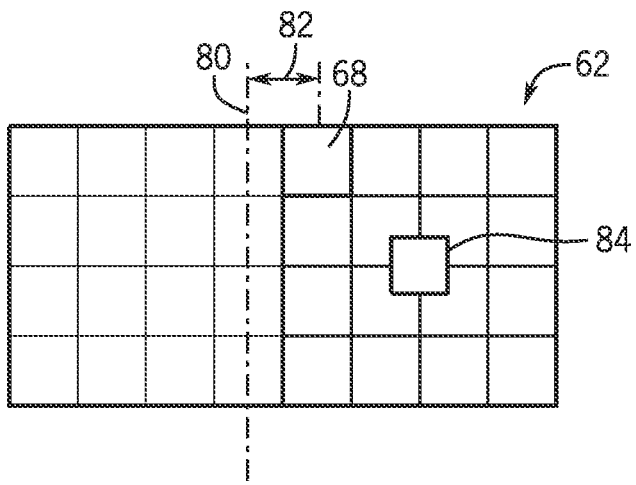
Figure 10E:
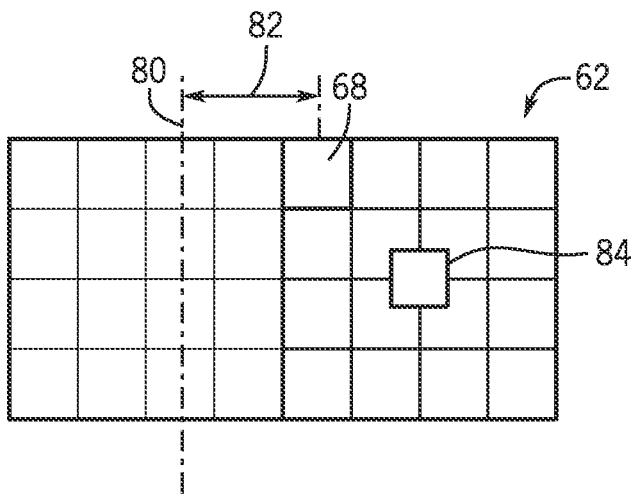
Figure 10F:
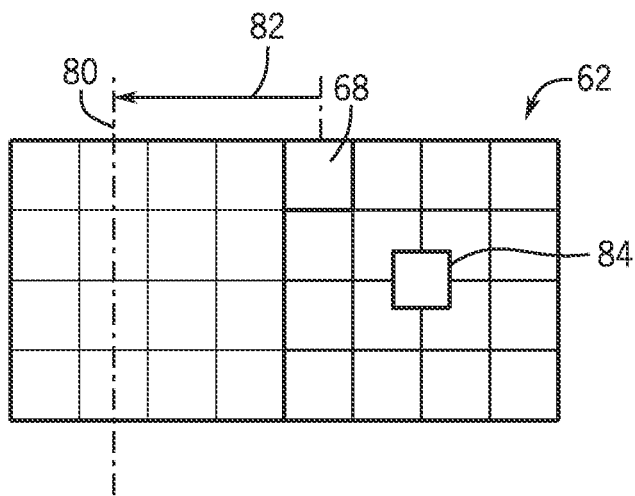

In FIG. 10C, the anchor pixel 68 is aligned with/crossing the grid line 80, resulting in a phase offset of 0. In FIG. 10D, the anchor pixel 68 is one pixel past the grid line 80, resulting in a phase offset of 1. In FIG. 10E, the anchor pixel 68 is two pixels past the grid line 80, resulting in a phase offset of 2. In FIG. 10F, the anchor pixel 68 is three pixels past the grid line 80, resulting in a phase offset of 3.

Figure 11A:
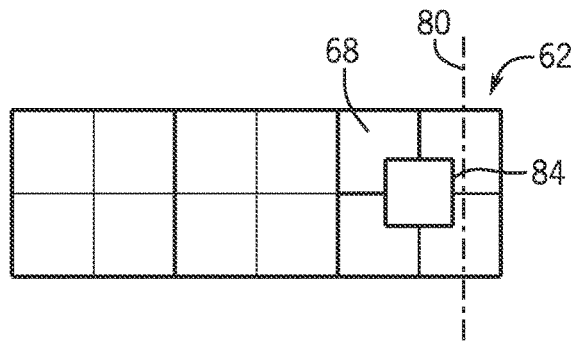
FIGS. 11A-11E are schematic diagrams of relative positions of 2×2 pixel groupings to gridlines of the vignetting grid of FIG. 9.
Figure 11C:
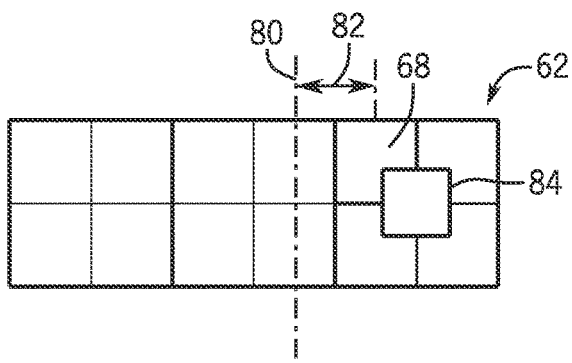
Figure 11B:
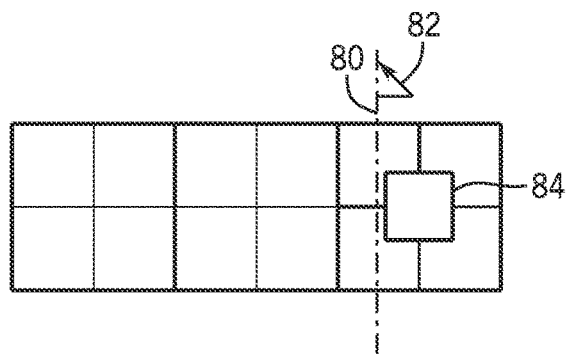

In a similar manner, phase offsets 82 may be designated for 2×2 pixel groupings 62, as in FIGS. 11A-11E. For example, in FIG. 11A, the anchor pixel 68 of the pixel grouping 62 has not yet crossed the grid line 80. In FIG. 11B, the anchor pixel 68 is aligned with/crossing the grid line 80, resulting in a phase offset of 0. In FIG. 11C, the anchor pixel

Figure 11D:
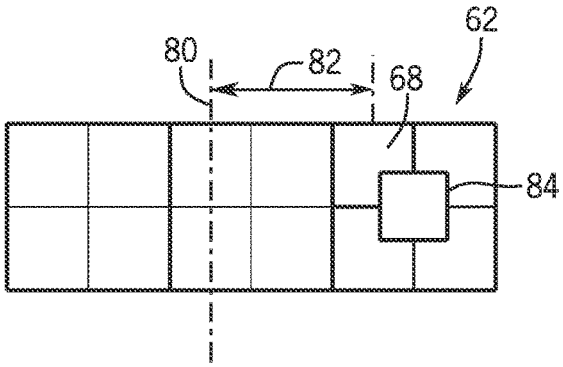
Figure 11E:
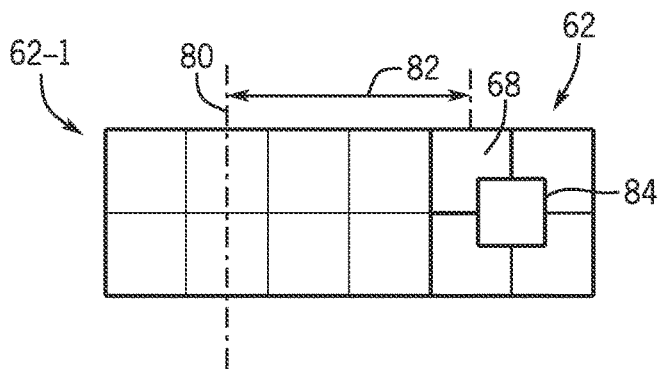

68 is one pixel past the grid line 80, resulting in a phase offset of 1. In FIG. 11D, the anchor pixel 68 is two pixels past the grid line 80, resulting in a phase offset of 2. In FIG. 11E, the anchor pixel 68 is three pixels past the grid line 80, resulting in a phase offset of 3. Indeed, although the pixel grouping 62 is a 2×2 pixel grouping 62, there is a possibility that the previous pixel grouping 62-1 is a higher order pixel grouping (e.g., 4×N), such that the 2×2 pixel grouping 62 is pushed further past the grid line 80.

Figure 12A:
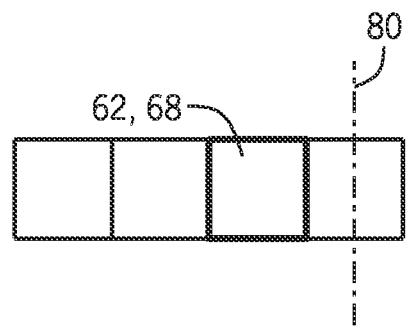
FIGS. 12A-12C are schematic diagrams of relative positions of 1×1 pixel groupings to gridlines of the vignetting grid of FIG. 9.
Figure 12B:
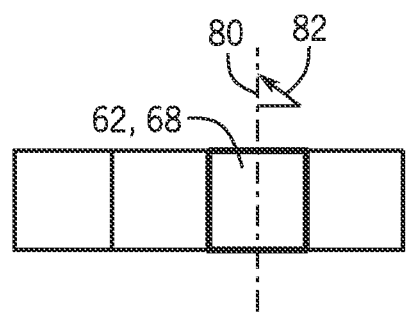
Figure 12C:
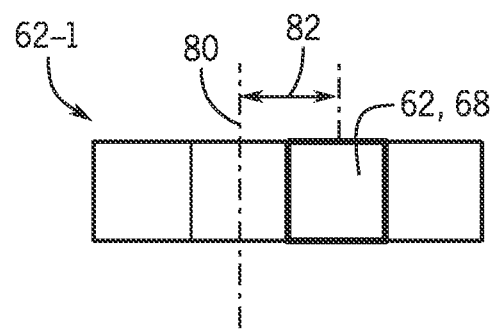

Furthermore, in the case of the 1×1 pixel grouping, the pixel grouping 62 is also the anchor pixel 68. For example, in FIG. 12A, the anchor pixel 68 of the pixel grouping 62 has not yet crossed the grid line 80. In FIG. 12B, the anchor pixel 68 is aligned with/crossing the grid line 80, resulting in a phase offset of 0. In FIG. 12C, the anchor pixel 68 is one pixel past the grid line 80, resulting in a phase offset of 1, which may occur when the previous pixel grouping 62-1 is a higher order (e.g., 2×2 pixel grouping) than the current pixel grouping 62. Given the adjustable regions 60 of FIG. 8, the 4×N pixel grouping 62 does not precede a 1×1 pixel grouping 62, such that phase offsets 82 greater than 1 do not occur for 1×1 pixel groupings 62. However, as should be appreciated, any size phase offsets 82 may be determined for any pixel grouping 62 depending on implementation (e.g., adjustable region configuration). Moreover, while exampled herein in the context of determining horizontal phase offsets 82 for 4×4, 2×2, and 1×1 pixel groupings 62, as should be appreciated, phase offsets 82 may be determined for any M×N size pixel grouping 62 in the horizontal and vertical directions (e.g., relative to vertical and horizontal grid lines 80, respectively). Additionally, in some embodiments, the determined phase offsets 82 may be utilized to anticipate the phase offsets 82 of a next pixel grouping 62 to be calculated based on the size of the pixel groupings 62 in the adjustable region 60.

Figure 13:
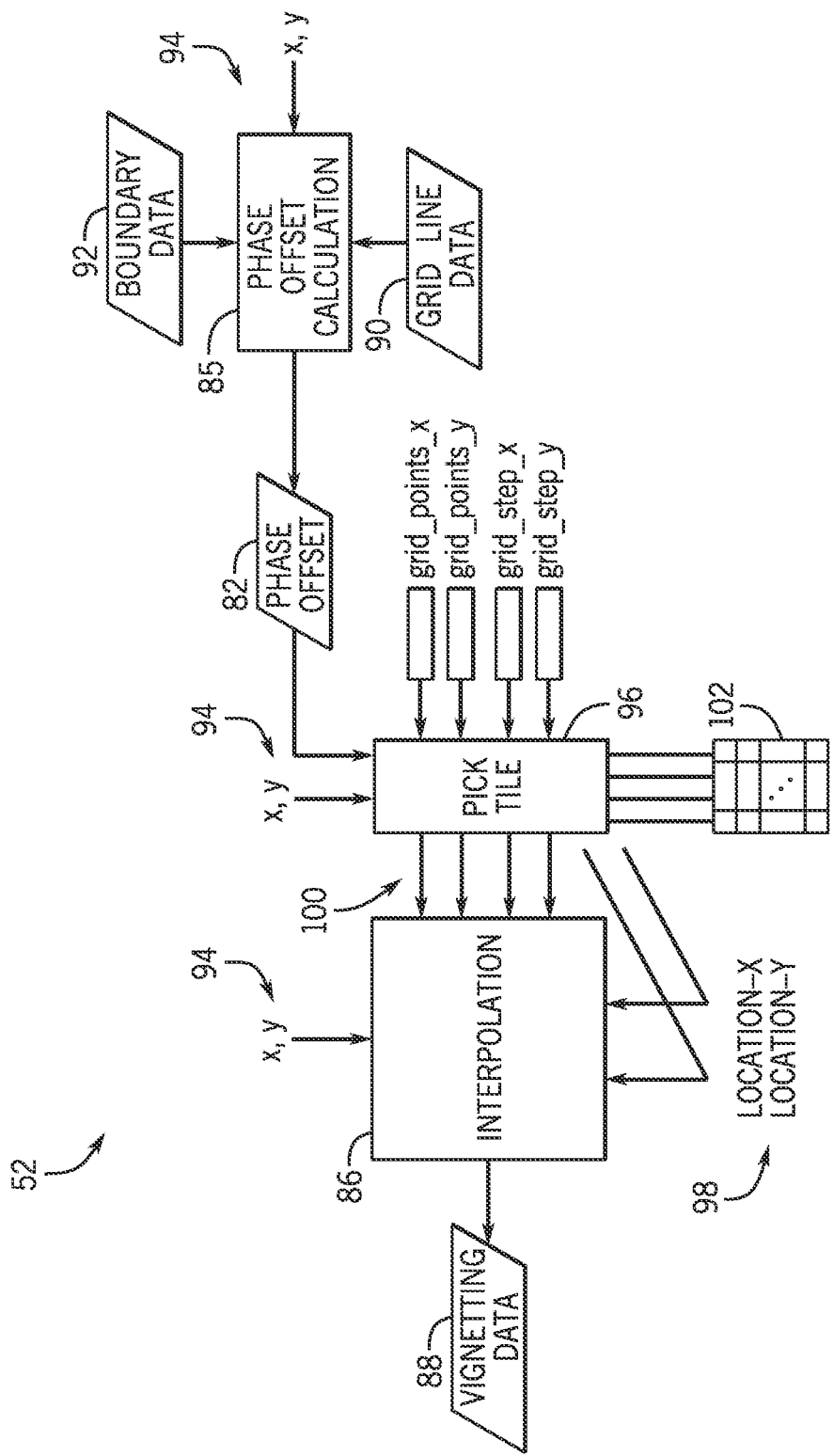
FIG. 13 is a schematic diagram of a portion of the vignetting block of FIG. 7.

As discussed above, the phase offset 82 may be calculated for each pixel grouping 62. To help illustrate, FIG. 13 is a schematic diagram of a portion of the vignetting block 52 that performs a phase offset calculation 85 and an interpolation 86 to determine vignetting data 88. As discussed above, the phase offset calculation 85 may determine the phase offset 82 based on the location of the pixel grouping 62 relative to the grid lines 80 of the vignetting grid 72. As such, the phase offset calculation 85 utilizes grid line data 90 and boundary data 92 in conjunction with the x-y coordinates 94 of the characteristic pixel (e.g., anchor pixel 68) of the pixel grouping 62 to determine the phase offset 82. The grid line data 90 may include any suitable information for determining the locations of the grid lines 80 relative to the x-y coordinates 94. Moreover, the boundary data 92 may be indicative of the boundaries 66 between the adjustable regions 60 or otherwise demarcating the changes in content resolution so as to determine the size of the pixel grouping 62 in the relevant direction (e.g., horizontal or vertical direction). As should be appreciated, such boundary data 92 may include any suitable information related thereto (e.g., used to derive the locations of the boundaries 66 or derived therefrom) such as the location of the focal point 64 and/or a center of the electronic display 12.

To determine the vignetting data 88 based on the phase offset 82, a pick tile block 96 may select a particular tile 76 of the vignetting grid 72 based on the x-y coordinates 94 of the pixel grouping 62, grid points in the x dimension (grid_points_x), grid points in the y dimension (grid_points_y), grid point steps in the x direction (grid_step_x), and/or grid point steps in the y direction (grid_step_y). In some embodiments, two independent multi-entry 1D vectors (one for each dimension), grid_points_x and grid_points_y, may be used to represent the grid points 74. In the example of FIG. 9, there are eighteen grid points 74 in each dimension. However, any suitable number of grid points 74 may be used.

As discussed above, the vignetting grid 72 may be relative to the native pixel resolution of the electronic display 12. As such, in some embodiments, the phase offset 82 may be considered to select the correct tile 76 in accordance with the anchor pixel 68 (or other characteristic pixel) of the pixel grouping 62 and determine the relative location 98 (e.g., location_x and location_y) of the pixel grouping 62 within the tile 76. Based on the selected tile 76, a corresponding set of vignetting values 100 may be selected from a table of vignetting values 102 (e.g., associated with the grid points 74). The vignetting data 88 may then be interpolated 86 from the set of vignetting values 100 based on the relative location 98 of the pixel grouping 62 within the tile 76. As should be appreciated, any form of interpolation 86 may be utilized, such as linear or bilinear interpolation, depending on implementation.

Figure 14:
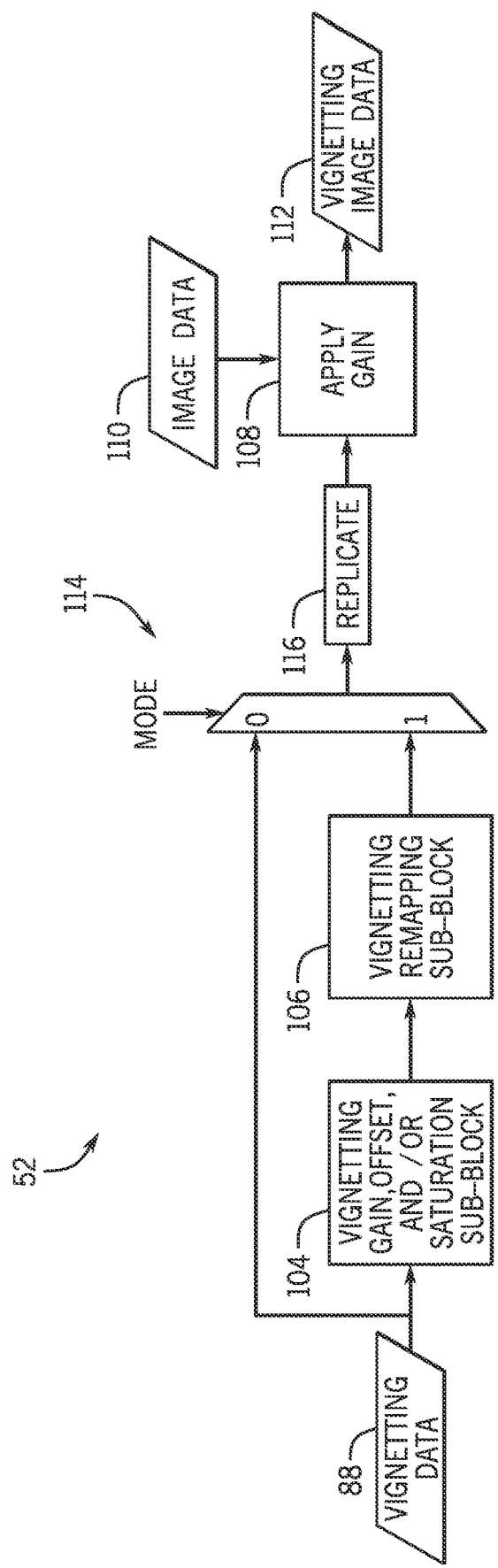
FIG. 14 is a schematic diagram of a portion of the vignetting block of FIG. 7.

In some embodiments, the vignetting data 88 may include a vignetting value (e.g., from zero to one, inclusive) to be applied to the image data of the pixel grouping 62. Additionally or alternatively, the vignetting block 52 may also include a selectable vignetting gain, offset, and/or saturation sub-block 104 and/or a vignetting remapping sub-block 106 to augment the vignetting data prior to applying the gain 108 to the image data 110 and generating the vignette image data 112, as shown in FIG. 14. For example, in some embodiments, a mode signal 114 may designate whether the vignetting data 88 is used as-is (e.g., from the interpolation 86) or processed through the vignetting gain, offset, and/or saturation sub-block 104 and/or the vignetting remapping sub-block 106. As should be appreciated, the vignetting gain, offset, and/or saturation sub-block 104 may provide programmable variations to the vignetting data 88 to alter the extent of the vignetting effect. Moreover, the vignetting remapping sub-block 106 may provide a programmable variation to the vignetting gradient (e.g., how quickly or slowly the vignetting fades spatially). For example, the vignetting remapping sub-block 106 may remap the vignetting data 88 based on a programmable look-up-table (LUT). Additionally, in some embodiments, the vignetting data 88 may be replicated 116 so as to be applied to multiple channels (e.g., red, blue, and green channels) of the image data 110.

Figure 15:
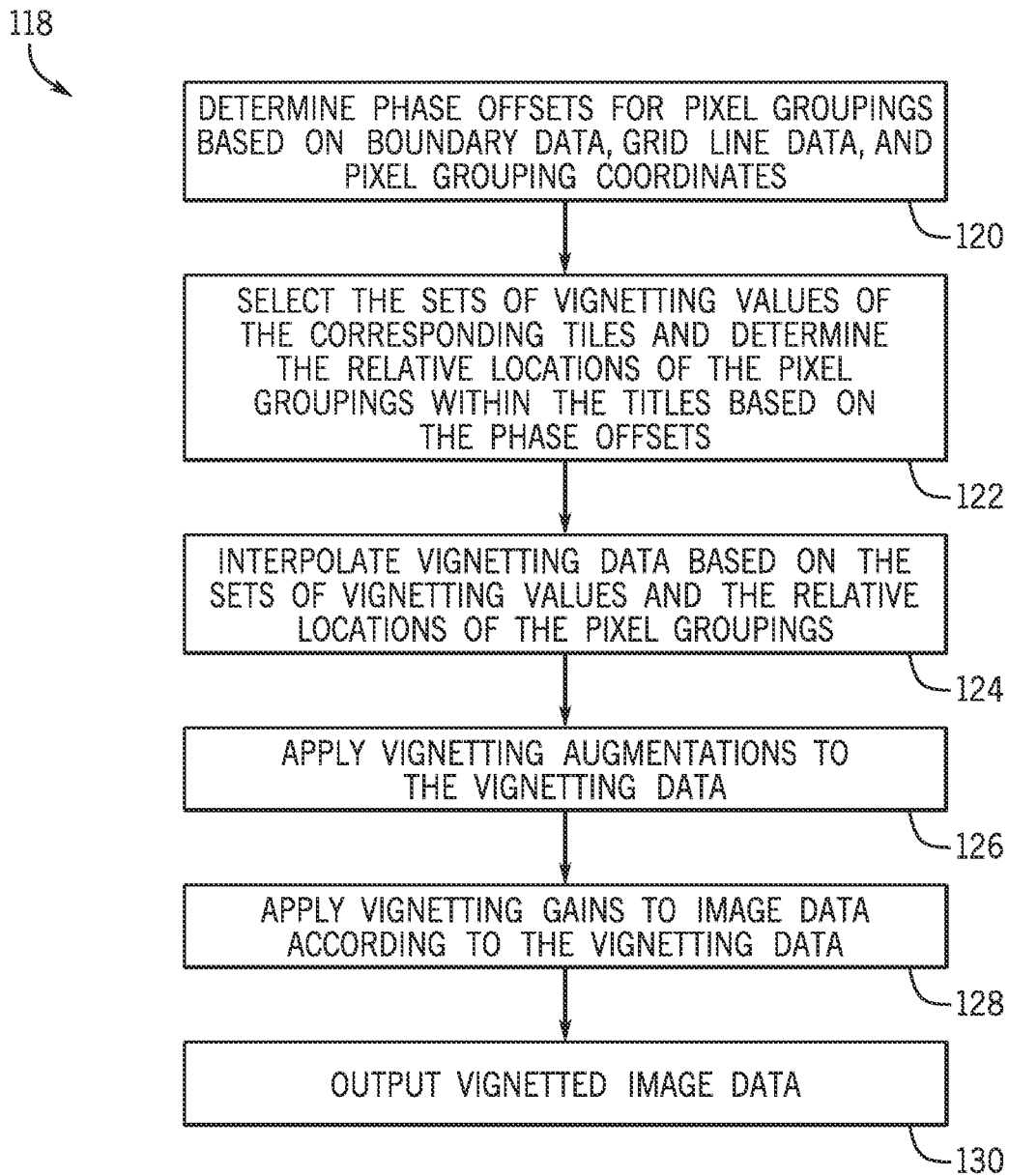
FIG. 15 is a flowchart of an example process for performing vignetting, in accordance with an embodiment.

FIG. 15 is a flowchart 118 of an example process for performing vignetting. In some embodiments, the vignetting block 52 may determine phase offsets 82 for pixel groupings 62 based on boundary data 92, grid line data 90, and the x-y coordinates 94 (e.g., coordinates of the anchor pixel 68, center 84, or other characteristic position of the pixel grouping 62) of the pixel grouping 62 (process block 120). Additionally, a set of vignetting values 100 may be selected, for each pixel grouping 62, that corresponds to the tiles 76 of the pixel groupings 62, and the relative locations 98 of the pixel groupings 62 within the tiles 76 may be determined, based on the phase offsets 82 (process block 122). Moreover, the vignetting data 88 may be interpolated 86 from the sets of vignetting values and the relative locations 98 of the pixel groupings 62 (process block 124). In some embodiments, vignetting augmentations may be applied to the vignetting data 88 (process block 126). For example, the vignetting gain, offset, and/or saturation sub-block 104 and/or the vignetting remapping sub-block 106 may apply a programmable alteration to the vignetting data 88. Additionally, the vignetting gains 108 may be applied to one or more channels of image data 110 to generate vignette image data 112 (process block 128), and the vignette image data 112 may be output (process block 130).

By determining the phase offsets 82 of multi-resolution image data pixel groupings 62 relative to grid lines 80 of a vignetting grid 72, the relative locations 98 of the pixel groupings 62 may be determined and vignetting data 88 interpolated 86 therefrom. Moreover, vignetting may be applied as a gain to image data 110 based on the vignetting data 88. As such, perceivable artifacts may be reduced or eliminated. Furthermore, although the flowchart 118 is shown in a given order, in certain embodiments, process/decision blocks may be reordered, altered, deleted, and/or occur simultaneously. Additionally, the flowchart 118 is given as an illustrative tool and further decision and process blocks may also be added depending on implementation.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system comprising:
an electronic display comprising a plurality of pixels and configured to display an image frame, the image frame having a plurality of resolutions based on display image data, wherein the image frame is divided into a plurality of regions having respective resolutions of the plurality of resolutions; and
image processing circuitry configured to generate the display image data based on multi-resolution image data of the image frame, wherein generating the display image data comprises:
determining vignetting data to be applied to a pixel grouping of the multi-resolution image data, wherein determining the vignetting data comprises:
determining a phase offset of the pixel grouping, wherein the phase offset comprises a relative distance between a characteristic pixel of the pixel grouping and a grid line of a vignetting grid, wherein the vignetting grid comprises a plurality of grid points corresponding to vignetting values;
determining a relative location of the characteristic pixel of the pixel grouping with respect to a tile defined by a set of grid points of the plurality of grid points based on the phase offset; and
interpolating between the vignetting values corresponding to the set of grid points based on the relative location to generate the vignetting data; and
applying the vignetting data to the multi-resolution image data of the pixel grouping.

2. The system of claim 1, wherein the pixel grouping comprises a set of pixels of the plurality of pixels corresponding to a resolution of the plurality of resolutions and configured to receive same values of the display image data.

3. The system of claim 1, wherein the phase offset is the relative distance between a location of the characteristic pixel of the pixel grouping and the grid line.

4. The system of claim 3, wherein the relative location is based on the characteristic pixel location.

5. The system of claim 3, wherein the location of the characteristic pixel comprises a location of an anchor pixel of the pixel grouping.

6. The system of claim 5, wherein the location of the anchor pixel comprises a location of a top left pixel of the pixel grouping.

7. The system of claim 1, wherein the tile at least partly comprises the pixel grouping.

8. The system of claim 7, wherein the tile comprises an anchor pixel of the pixel grouping.

9. The system of claim 1, wherein the vignetting grid is non-uniformly spaced.

10. The system of claim 9, wherein the vignetting grid comprises a dynamic grid that is changeable per image frame.

11. The system of claim 1, wherein determining the vignetting data comprises applying a programmable gain or offset to the vignetting data.

12. Image processing circuitry comprising:
processing block circuitry configured to generate display image data based on an image frame of multi-resolution image data, wherein the image frame is divided into a plurality of regions having respective resolutions of a plurality of resolutions; and
vignetting block circuitry configured to generate the display image data based on the multi-resolution image data by:
determining boundary data indicative of first locations of boundaries between the plurality of regions;
obtaining grid line data indicative of second locations of grid lines of a vignetting grid, wherein the vignetting grid comprises a plurality of grid points corresponding to vignetting values;
determining a phase offset of a pixel grouping corresponding to a relative distance between a characteristic pixel of the pixel grouping and a grid line of the grid lines based on the grid line data and the boundary data;
determining a relative location of the characteristic pixel of the pixel grouping with respect to a tile defined by a set of grid points of the plurality of grid points based on the phase offset;
interpolating between the vignetting values corresponding to the set of grid points to generate vignetting data based on the relative location; and
applying the vignetting data to the multi-resolution image data of the pixel grouping.

13. The image processing circuitry of claim 12, wherein the vignetting block circuitry is configured to remap the vignetting data according to a programmable look-up-table (LUT).

14. The image processing circuitry of claim 12, wherein the pixel grouping comprises a set of pixels corresponding to a resolution of the plurality of resolutions and configured to receive same values of the display image data.

15. The image processing circuitry of claim 12, wherein the vignetting data comprises an amount of vignetting to be applied.

16. The image processing circuitry of claim 15, wherein the amount of vignetting to be applied comprises a factor from zero to one, inclusive.

17. A non-transitory machine-readable medium comprising instructions, wherein, when executed by one or more processors, the instructions cause the one or more processors to perform operations or to control image processing circuitry to perform the operations, wherein the operations comprise:
   determining boundary data indicative of first locations of boundaries between a plurality of regions that define areas of different content resolutions of an image frame of multi-resolution image data;
   determining vignetting data to be applied to a pixel grouping of the multi-resolution image data, wherein determining the vignetting data to be applied to the pixel grouping comprises:
      determining a phase offset of the pixel grouping, wherein the phase offset comprises a relative distance between a characteristic pixel of the pixel grouping and a grid line of a vignetting grid, wherein the vignetting grid comprises a plurality of grid points corresponding to vignetting values;
      determining a relative location of the characteristic pixel of the pixel grouping with respect to a tile defined by a set of grid points of the plurality of grid points based on the phase offset;
      interpolating between the vignetting values corresponding to the set of grid points to generate the vignetting data based on the relative location; and
      applying the vignetting data to the multi-resolution image data of the pixel grouping.

18. The non-transitory machine-readable medium of claim 17, wherein the phase offset is the relative distance between a location of the characteristic pixel of the pixel grouping and the grid line.

19. The non-transitory machine-readable medium of claim 18, wherein the location of the characteristic pixel comprises a location of a center pixel of the pixel grouping.

20. The non-transitory machine-readable medium of claim 17, wherein the tile at least partly comprises the pixel grouping.

* * * * *